United States Patent
Araki

(10) Patent No.: US 7,260,729 B2
(45) Date of Patent: Aug. 21, 2007

(54) HOME NETWORK STATION WITH STREAMING MEDIA FUNCTION AND POWER CONTROL METHOD THEREOF

(75) Inventor: Katsuhiko Araki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 378 days.

(21) Appl. No.: 10/917,297

(22) Filed: Aug. 13, 2004

(65) Prior Publication Data

US 2005/0060588 A1   Mar. 17, 2005

(30) Foreign Application Priority Data

Aug. 14, 2003  (JP) ............................. 2003-207571

(51) Int. Cl.
*G06F 1/00* (2006.01)
(52) U.S. Cl. ...................................... 713/300; 713/324
(58) Field of Classification Search ................ 713/300, 713/324
See application file for complete search history.

(56) References Cited

U.S. PATENT DOCUMENTS

| | | | |
|---|---|---|---|
| 5,515,511 A * | 5/1996 | Nguyen et al. ............. | 725/117 |
| 5,617,571 A * | 4/1997 | Tanaka ....................... | 713/324 |
| 6,922,788 B2 * | 7/2005 | Eberhard et al. ............ | 713/320 |
| 7,073,077 B1 * | 7/2006 | Gavlik ........................ | 713/300 |
| 2003/0142213 A1 * | 7/2003 | Ali et al. .................... | 348/180 |
| 2004/0019813 A1 * | 1/2004 | Kobayashi .................. | 713/300 |

FOREIGN PATENT DOCUMENTS

| | | |
|---|---|---|
| JP | 9-128106 | 5/1997 |
| JP | 11-327706 | 11/1999 |
| KR | 2002-0054941 | 7/2002 |

OTHER PUBLICATIONS

Notification for Filing Opinion from Korean Patent Office mailed Dec. 15, 2005, in Korean Patent Application No. 10-2004-0063448.
Notification of the First Office Action from Chinese Patent Office dated Sep. 9, 2005, in Chinese Application No. 200410057494.3.
"Advanced Configuration and Power Interface Specification"; ACPI Harware Specification, Revision 2.0, Compaq Computer Corporation, Intel Corporation, Microsoft Corporation, Phoenix Technologies Ltd., Toshiba Corporation, pp. 48-51, (Jul. 2000).

* cited by examiner

*Primary Examiner*—Thomas Lee
*Assistant Examiner*—Ji H. Bae
(74) *Attorney, Agent, or Firm*—Finnegan, Henderson, Farabow, Garrett & Dunner, L.L.P.

(57) ABSTRACT

An electronic device includes a first circuit block and a second circuit block. The first circuit block executes a data processing, and the second circuit block executes a processing associated with network routing. A controller selects an operating mode from among a plurality of operating modes including a first operating mode to supply power to at least the first circuit block and the second circuit block and a second operating mode to supply power to at least the second circuit block not supplying power to at least the first circuit block.

18 Claims, 14 Drawing Sheets

| State | Mode | Explanation |
|---|---|---|
| G3 | Mechanical off | The power switch turns off<br>The system does not operate<br>Power is supplied only to the RTC (real time clock), and the system can be operated by the power switch of the main unit |
| G2 | Standby | The system stands by<br>The display panel and display LED are both active<br>Power is supplied to the power management microcomputer or its equivalent hardware to receive Wakeup events from modules such as the switch, remote control, WOL (Wake On LAN), WOR (Wake ON Ring), and timer<br>The power of the system is turned off and thus power consumption is very low |
| G1 | Network File server | A router (file server) operating mode to allow service of router and file server functions<br>The display panel and display LED are both active<br>If there is a network subsystem, power is supplied thereto. If the main CPU (100) fulfills a network function, power is supplied to the main system and the network unit<br>Power is also supplied to the HDD (127) and HDD controller (204) in order to support the file server<br>When the main CPU (100) or other devices do not perform tasks in order to decrease power consumption, each of the devices shifts to its halt state, sleep state or clock stop state |
| G0 | Run | A full operating mode to allow service of all functions<br>Power is supplied to the stream controller (300) that receives a broadcast stream and an I/O processor (USB, 1394, SD, memory card I/F)<br>When the main CPU (100) or other devices do not perform tasks in order to decrease power consumption, each of the devices shifts to its halt state, sleep state or clock stop state |

FIG. 3

| Event | Definition |
|---|---|
| Power_ON | This even is issued when the main power switch turns on or the power plug is inserted |
| Power_OFF | This event is issued when the main power switch turns off or the power plug is removed |
| Router_EN | This event is issued when the switch of the main unit is changed or it is preset in a nonvolatile memory area. The state is shifted from G3 and G1 to the next state<br>Router EN=0 : G3->G2, G0->G2/G1 (To determine which of G1 and G2 depends upon the event Shutdown_EVT)<br>Router EN=1 : G3->G1, G0->G1 |
| Router_Wakeup | This event is issued to make a request to start a network service from each device and devices connected to the network<br>Panel SW (Router Power button, etc)<br>IR remote (Router Power button, etc)<br>RTC Timer (wake on alarm ; time adjust, etc)<br>WOL (wake on Lan)<br>Wake on Wireless LAN<br>WOR (wake on Ring)<br>USB wake up (KB,etc)<br>BT wake up (Activity)<br>1394 link on packet |
| Router_OFF | This event is issued to make a request to end a network service from each device and devices connected to the network<br>Panel SW (Router Power button, etc)<br>IR remote (Router Power button, etc)<br>RTC Timer (shutdown alarm, etc)<br>Command to request Router Shutdown by devices (LAN, wireless LAN, USB, 1394, BT, etc.) connected to the network |
| PON_EVT | This event is issued to make a request to turn on the power from each device and devices connected to the network<br>Panel SW (power,play,Open/Close, etc)<br>IR remote (power,play,Open/Close, etc)<br>RTC Timer (wake on alarm ; time adjust, etc)<br>Command to request Power ON by devices (LAN, wireless LAN, USB, 1394, BT, etc.) connected to the network (G1->G0 shift)<br>WOL(wake on Lan)<br>Wake on Wireless LAN<br>WOR(wake on Ring)<br>USB wake up(KB,etc)<br>BT wake up(Activity)<br>1394 link on packet |
| Shutdown_EVT | This event is issued to make a request to turn on the power from each device and devices connected to the network<br>Penal SW (power, etc)<br>IR remote (power, etc)<br>RTC Timer (shutdown alarm, etc)<br>Command to request Shutdown by devices (LAN, wireless LAN, USB, 1394, BT, etc.) connected to the network |
| Power_Fail | This event is issued when a power abnormality occurs |

FIG. 5

| State | | Function | MPU, Memory controller, Host I/F | Front end stream I/F | Video processor | Audio processor |
|---|---|---|---|---|---|---|
| ST2 | Idle | Idle state | Run/Standby | Off | Off | Off |
| ST1 | Storage | File server, Media Exchange | Run/Standby | Off | Off | Off |
| ST0 Run | AV0 | Live broad cast, Time Shift, Video record | Run/Standby | Run | Run | Run |
| | AV1 | Video Play back, Network contents player, Image Viewer, Mail/browser, Video editor | Run/Standby | Off/Standby | Run | Run |
| | AV2 | Video record, Audio record | Run/Standby | Run | Off/Standby | Off/Standby |
| | Audio | Audio play back | Run/Standby | Off/Standby | Off/Standby | Run |

F I G. 6

| Event (command) | | Explanation | Priority |
|---|---|---|---|
| AV_cmd_0 | | The following commands are received from the panel switch, remote control, and device connected to the network<br>File server,<br>Media Exchange | When two functions are performed at the same time, the operating modes of blocks are ORed to shift to a power state to satisfy both the functions<br><br>Ex.<br>Video Play back,<br>Video record<br><br>The power state is AV0 when the functions are performed at the same time |
| AV_cmd_1 | AV_cmd_1_0 | The following commands are received from the panel switch, remote control, and device connected to the network<br>Live broad cast,<br>Time Shift,<br>Video record | |
| | AV_cmd_1_1 | The following commands are received from the panel switch, remote control, and device connected to the network<br>Video Play back,<br>Network contents player,<br>Image Viewer,<br>Mail/browser,<br>Video editor | |
| | AV_cmd_1_2 | The following commands are received from the panel switch, remote control, and device connected to the network<br>Video record,<br>Audio record | |
| | AV_cmd_1_a | The following commands are received from the panel switch, remote control, and device connected to the network<br>Audio play back | |
| AV_cmd_2 | | The following commands are received from the panel switch, remote control, and device connected to the network<br>Stop command | |

FIG. 8

HOME NETWORK STATION WITH STREAMING MEDIA FUNCTION AND POWER CONTROL METHOD THEREOF

CROSS-REFERENCE TO RELATED APPLICATIONS

This application is based upon and claims the benefit of priority from prior Japanese Patent Application No. 2003-207571, filed Aug. 14, 2003, the entire contents of which are incorporated herein by reference.

BACKGROUND OF THE INVENTION

1. Field of the Invention

The present invention relates to an electronic device having a function of selecting from among a plurality of operating modes that differ in power consumption, and a power control method.

2. Description of the Related Art

Recently, electronic devices such as multimedia-capable personal computers, game machines and audiovisual devices have been developed. Attention has been given to a home network device for combining these electronic devices using a home network device and storing data, especially stream data such as broadcast program data in the home network device.

The home network device employs a high-performance processor because it needs to fulfill a router function of network routing, a file server function, and a function of receiving and processing stream data for broadcast. Thus, the home network device increases in power consumption even when it is idle. The home network device is energized at all times and thus its thermal design or cooling fan's noise cannot be ignored.

In view of the above, a technique of effectively suppressing power consumption is desired in electronic devices such as home network devices.

Various power-saving techniques have conventionally been proposed. For example, Jpn. Pat. Appln. KOKAI Publication No. 11-327706 discloses a device in which an electronic circuit is divided into a plurality of circuit blocks and power is selectively supplied to one of the circuit blocks necessary for operating in different system modes.

However, the conventional power-saving techniques are not directed to an electronic device such as a home network device. A fine power control is not therefore performed, paying attention to power consumption in a circuit block that performs a process associated with network routing and a circuit block that processes audiovisual (AV) data, i.e., receives stream data. The conventional techniques cannot decrease power consumption sufficiently in an electronic device such as a home network device.

Therefore, there is a need to provide an electronic device capable of effectively suppressing power consumption due to that of high power circuit blocks, and a power control method.

BRIEF SUMMARY OF THE INVENTION

According to one aspect of the present invention, there is provided an electronic device comprising a first circuit block which executes a data processing; a second circuit block which executes a processing associated with network routing; and a controller which selects an operating mode from among a plurality of operating modes including a first operating mode to supply power to at least the first circuit block and the second circuit block and a second operating mode to supply power to at least the second circuit block not supplying power to at least the first circuit block.

According to another aspect of the present invention, there is provided a power control method applied to an electronic device having a first circuit block which executes a data processing and a second circuit block which executes a processing associated with network routing, comprising monitoring a status of the electronic device; and selecting an operating mode from among a plurality of operating modes including a first operating mode to supply power to at least the first circuit block and the second circuit block and a second operating mode to supply power to at least the second circuit block not supplying power to the first circuit block, in accordance with the status monitored.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a table illustrating different operating modes selected by the uCOM;

FIG. 5 is a table of definitions of the events shown in FIG. 4;

FIG. 6 is a table illustrating different states included in a run mode;

FIG. 8 is a table of definitions of the events (commands) shown in FIG. 7;

DETAILED DESCRIPTION OF THE INVENTION

Embodiments of the present invention will be described below with reference to the drawings.

Figure 1:
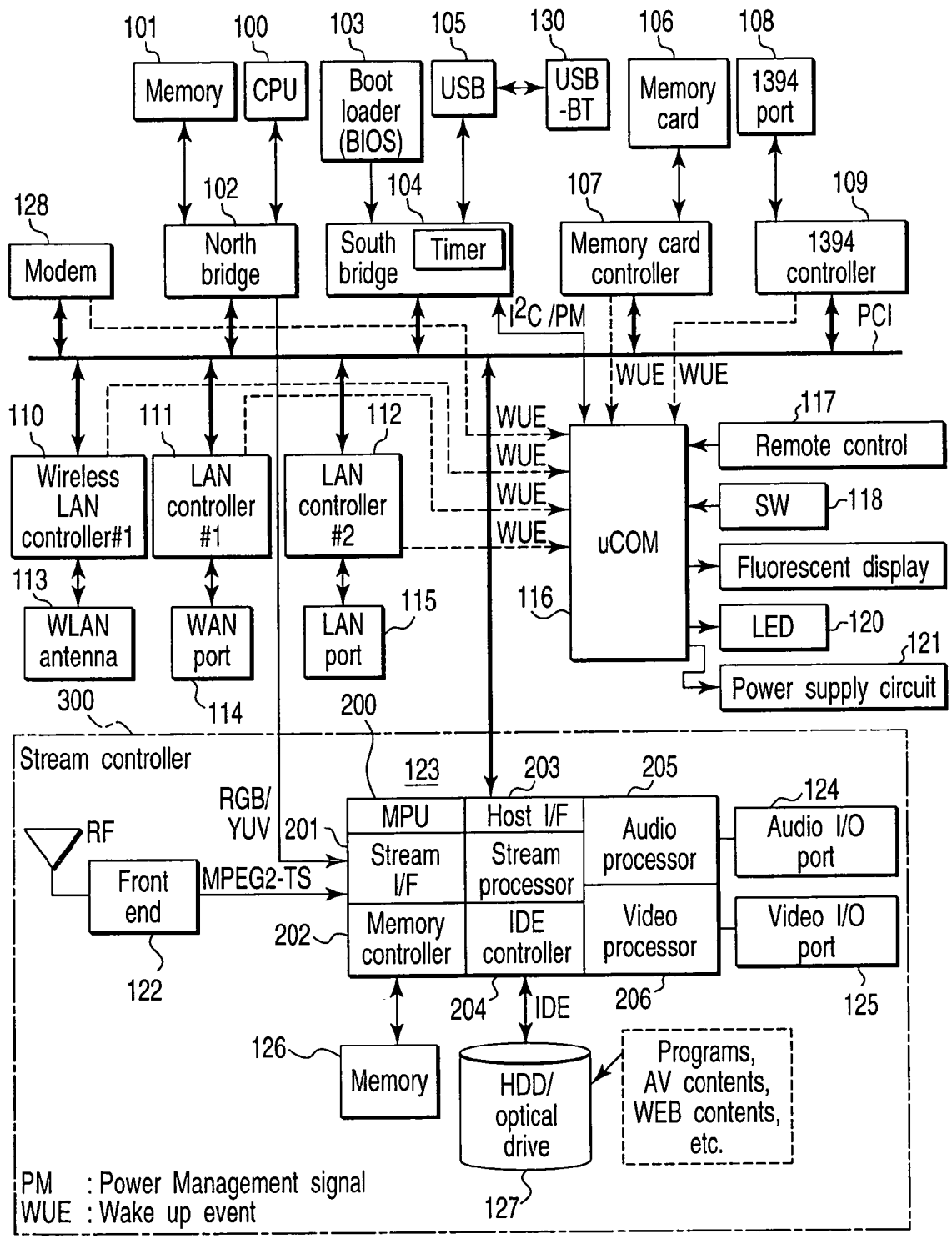
FIG. 1 is a block diagram showing a configuration of a home network station according to an embodiment of the present invention.

FIG. 1 is a block diagram showing a configuration of a home network station according to an embodiment of the present invention.

The home network station shown in FIG. 1 is an electronic device to which a multimedia-capable personal computer, a game machine and an audiovisual (AV) device can be connected through a network or the like. The home network station includes a circuit block for performing a process associated with network routing (file processing using a file server function) and a circuit block for processing AV data (including reception of stream data).

The home network station also includes a main CPU 100, a system memory 101, a north bridge 102, a boot loader 103, a south bridge 104, a universal serial bus (USB) port 105, a memory card interface 106, a memory card controller 107, an IEEE 1394 port 108, an IEEE 1394 controller 109, a wireless local area network (LAN) controller 110, a LAN controller (on the WAN side) 111, a LAN controller (LAN side) 112, a wireless LAN antenna 113, a wide area network (WAN) port 114, a LAN port 115, a uCOM 116, a remote control light-receiving section 117, a panel switch section 118, a fluorescent display 119, a light-emitting diode (LED) 120, a power supply circuit 121, a front end 122, a stream processor 123, an audio input/output port 124, a video input/output port 125, a frame buffer memory 126, a hard disk drive (HDD)/optical drive 127, a modem 128 and a USB-Bluetooth module 130.

The front end 122, stream processor 123, audio input/output port 124, video input/output port 125, frame buffer memory 126 and HDD/optical drive 127 make up a stream controller (AV data processor) 300.

The above components will be described below.

The main CPU 100 controls the entire operation of the home network station. The main CPU 100 executes a given program to control the system in its entirety.

The system memory 101 is a random access memory (RAM) used as a work area of the main CPU 100. An operating system (OS), various programs, various drivers, etc. are resident in the system memory 101.

The north bridge 102 includes a CPU interface and various controllers such as a memory controller and a VGA controller. It serves as a bridge to connect devices (e.g., the main CPU 100 and a peripheral component interconnect (PCI) bus).

The boot loader 103 corresponds to, for example, a BIOS-ROM with a basic input/output system (BIOS) for setting hardware.

The south bridge 104 has an I/O controller and an real time clock (RTC) timer and serves as a bridge to connect devices (e.g., the USB port 105 and PCI bus). The south bridge 104 is connected to the uCOM 116 through an inter integrated circuit ($I^2C$) bus to allow a signal indicative of power management to be transmitted/received. For example, the south bridge 104 can issue a Wake-on signal to the uCOM 116.

The USB port 105 is an interface to detachably connect a USB device that conforms to a USB.

The memory card interface 106 is an interface to detachably connect a memory card such as a compact flash and a secure digital (SD) card.

The memory card controller 107 controls a memory card connected to the memory card interface 106 and operates as a PCI device connected to the PCI bus. Upon receiving a given request (e.g., a request to use network service and a request to complete the service) from a memory card through the memory card interface 106, the memory card controller 107 issues a corresponding event (e.g., Router_Wakeup/Router_Off) to the uCOM 116.

The IEEE 1394 port 108 is an interface to detachably connect an IEEE 1394 device that conforms to IEEE 1394.

The IEEE 1394 controller 109 controls a device connected to the IEEE 1394 port 108 (with respect to a Link/PHY layer) and operates as a PCI device connected to the PCI bus. Upon receiving a given request (e.g., a request to use network service and a request to complete the service) from the IEEE 1394 device through the IEEE 1394 port 108, the IEEE 1394 controller 109 issues a corresponding event (e.g., Router_Wakeup/Router_Off) to the uCOM 116.

The wireless LAN controller 110 controls its connection with a wireless LAN and operates as a PCI device connected to the PCI bus. Upon receiving a given request (e.g., a request to use network service and a request to complete the service) from a device on the network through the wireless LAN antenna 113, the wireless LAN controller 110 issues a corresponding event (e.g., Router_Wakeup/Router_Off) to the uCOM 116.

The LAN controller (on the WAN side) 111 controls its connection with a WAN and operates as a PCI device connected to the PCI bus. Upon receiving a given request (e.g., a request to use network service and a request to complete the service) from a device on the network through the WAN port 114, the LAN controller 111 issues a corresponding event (e.g., Router_Wakeup/Router_Off) to the uCOM 116.

The LAN controller (on the LAN side) 112 controls its connection with a LAN and operates as a PCI device connected to the PCI bus. Upon receiving a given request (e.g., a request to use network service and a request to complete the service) from a device on the network through the WAN port 115, the LAN controller 112 issues a corresponding event (e.g., Router_Wakeup/Router_Off) to the uCOM 116.

The wireless LAN antenna 113 wirelessly transmits/receives data to/from a device through the wireless LAN.

The WAN port 114 is an interface to transmit/receive data to/from a device connected to the WAN.

The LAN port 115 is an interface to transmit/receive data to/from a device connected to the LAN.

The uCOM 116 is a power management microcomputer to manage power, control infrared rays (IR), interface a switch, control an LED, control a display, manage Wakeup factors, control a cooling fan, and the like. Their details will be described later.

The remote control light-receiving section 117 receives infrared rays from a remote control attached to the home network station and notifies the uCOM 116 of the contents indicated by the infrared rays.

The panel switch section 118 has various switches. The switches are provided on a panel of the main unit of the home network station. The switches include a main power switch (or button) to turn on/off the main power of the main unit of the home network station and a router power switch (or button) to turn on/off the power of a circuit block for performing a process associated with network routing (and performing file processing by a file server function). The panel switch section 118 also has an AV data processing power switch (or button) to turn on/off the power of a circuit block for processing AV data and a routing mode shifting switch to shift a preset operating mode (to selectively determine whether to change to a routing mode, described later, when the main power switch is turned on or shut down). The above switches are provided on the remote control side.

The fluorescent display 119 displays various items of information transmitted from the uCOM 116 by fluorescence. The LED 120 is an indicator to indicate data of various states transmitted from the uCOM 116 by light emission. The power supply circuit 121 supplies necessary power to respective components in the home network station under the control of the uCOM 116.

The front end 122 includes a tuner, a video decoder, an MPEG encoder and a sound circuit. The front end 122 receives broadcast signals (broadcast stream data) from broadcast stations, selects a channel, and processes image and voice data. Then, the front end 122 outputs the processed data to the stream processor 123.

The stream processor 123 is a high-performance processor to process broadcast stream data or AV contents data. For example, the stream processor 123 records the stream data output from the front end 122 on the HDD/optical driver 127 and transfers the recorded stream data to a device through the audio input/output port 124, the video input/output port 125 and the like.

The stream processor 123 includes a micro processor unit (MPU) 200, a stream interface 201, a memory controller 202, a host interface 203, an integrated device electronics (IDE) controller 204, an audio processor 205 and a video processor 206.

The MPU 200 controls the entire operation of the stream processor 123. The stream interface 201 receives stream data from the front end 122 and image signals from the north bridge 102. The stream interface 201 can be provided with an MPEG decoder. The memory controller 202 controls the memory 126. The host interface 203 communicates with a host through the PCI bus. The IDE controller 204 controls the HDD/optical driver 127 that is compatible with IDE. The audio processor 205 processes audio signals transmitted/received through the audio input/output port 124. The video processor 206 processes video signals transmitted/received through the video input/output port 125.

The file server function is fulfilled chiefly by the IDE controller 204 and HDD/optical driver 127. When the file server function is performed, power is supplied to the MPU 200, memory controller 202, host interface 203, IDE controller 204 and HDD/optical drive 127 because they require power to perform file processing. In this case, power need not always be supplied to the stream interface 201, audio processor 205 or video processor 206.

The audio input/output port 124 corresponds to a Line IN/OUT, an SPDIF and the like and serves as an interface to input/output audio signals to/from an AV device. The video input/output port 125 corresponds to a composite, an S connector, a digital video port and the like and serves as an interface to input/output video signals to/from an AV device.

The memory 126 temporarily stores stream data and the like. The HDD/optical driver 127 corresponds to an HDD for driving a hard disk and an optical drive for driving a CD, a DVD-ROM, a DVD-RAM and the like and stores stream data, Internet contents, programs, etc.

The modem 128 modulates/demodulates signals with an external analog line and is connected to the PCI bus. The USB-Bluetooth module 130 is connected to the USB port 105 and has a function of wireless communication with a Bluetooth® device. The USB-Bluetooth module 130 interfaces between USB-based data and Bluetooth-based data.

In the home network station shown in FIG. 1, the circuit block for performing a process associated with network routing is made up of the memory card controller 107, IEEE 1394 controller 109, wireless LAN controller 110, LAN controller (on the WAN side) 111, LAN controller (on the LAN side) 112, and modem 128. The circuit block for processing AV data corresponds to the stream controller 300.

Figure 2:
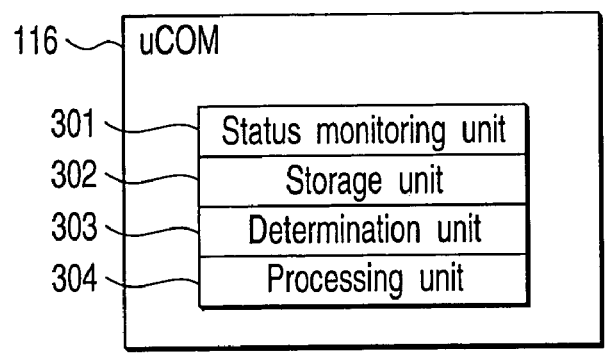
FIG. 2 is a schematic block diagram of functions of a uCOM in the home network station.

FIG. 2 is a schematic block diagram of functions of the uCOM 116.

As described above, the uCOM 116 manages power, controls infrared rays (IR), interfaces a switch, controls an LED, controls a display, manages Wakeup factors, controls a cooling fan, and the like. The uCOM 116 can switch among a plurality of operating modes (described later) in power management to reduce power consumption effectively according to the circumstances. In order to fulfill the functions, the uCOM 116 has a status monitoring unit 301, a storage unit 302, a determination unit 303 and a processing unit 304.

The status monitoring unit 301 detects various events and commands issued from the remote control light-receiving section 117, panel switch section 118, controllers 107, 109 and 110 to 112, and modem 128 and monitors the status (in other words, the unit 301 monitors signals of a physical layer through not the main CPU 100 but the I/O controllers to acquire Wakeup events and the like). The storage unit 302 includes a register group and stores various information items (event information, operating modes, states, etc.) indicative of the current status. The determination unit 303 performs various determination processes. For example, it determines an operating mode to be changed next or an item to be processed in accordance with various events and commands. The processing unit 304 performs a process based on the contents determined by the determination unit 303.

Some of the functions fulfilled by the uCOM can be formed by software or by not software but one piece of hardware.

The operating modes to be selected by the uCOM 116 will be described with reference to FIG. 3.

There are at least four operating modes regarding power management: a mechanical-off mode, a standby mode, a network/file server mode, and a run mode.

The mechanical-off mode corresponds to a state (G3) in which the power switch of the main unit turns off. In this state, the system does not operate but basically, power is supplied to only the RTC timer in the south bridge 104. The system can be operated in accordance with an operation of the power switch of the main unit.

The standby mode corresponds to a state (G2) in which the system stands by. In this state, the display panel and LED of the main unit are both active. Power is supplied to the uCOM 116 that is a power management microcomputer or its equivalent hardware. The uCOM 116 can receive Wakeup events from modules such as the switch 118, remote control light-receiving section 117, WOL (Wake On LAN), WOR (Wake ON Ring), and RTC timer. In the standby mode, the power of the system is turned off and thus power consumption is very low.

The network/file server mode corresponds to a state (G1) that allows service of network routing (and file processing) using a router function (and a file server function). If there is a network subsystem, power is supplied thereto in this mode. On the other hand, if the main CPU 100 fulfills a network function, power is supplied to a network main system and a network unit (wireless controller 110, LAN controller 111, LAN controller 112, etc.). In the network/file server mode, the uCOM 116 selectively supplies and stops power to each of elements that make up the network unit according to the circumstances. Power is also supplied to the HDD 127 and HDD controller 204 in order to support the file server function. When the main CPU 100 or other devices do not perform tasks in order to decrease power consumption, each of the devices shifts to its halt state, sleep state or clock stop state.

The run mode corresponds to a state (G0) that allows service using all functions. In this mode, power is supplied to the stream controller 300 that receives broadcast stream data and an I/O processor (USB port 105, memory card interface 106, IEEE 1394 port 108, etc.). When the main CPU 100 or other devices do not perform tasks in order to decrease power consumption, each of the devices shifts to its halt state or clock stop state.

Figure 4:
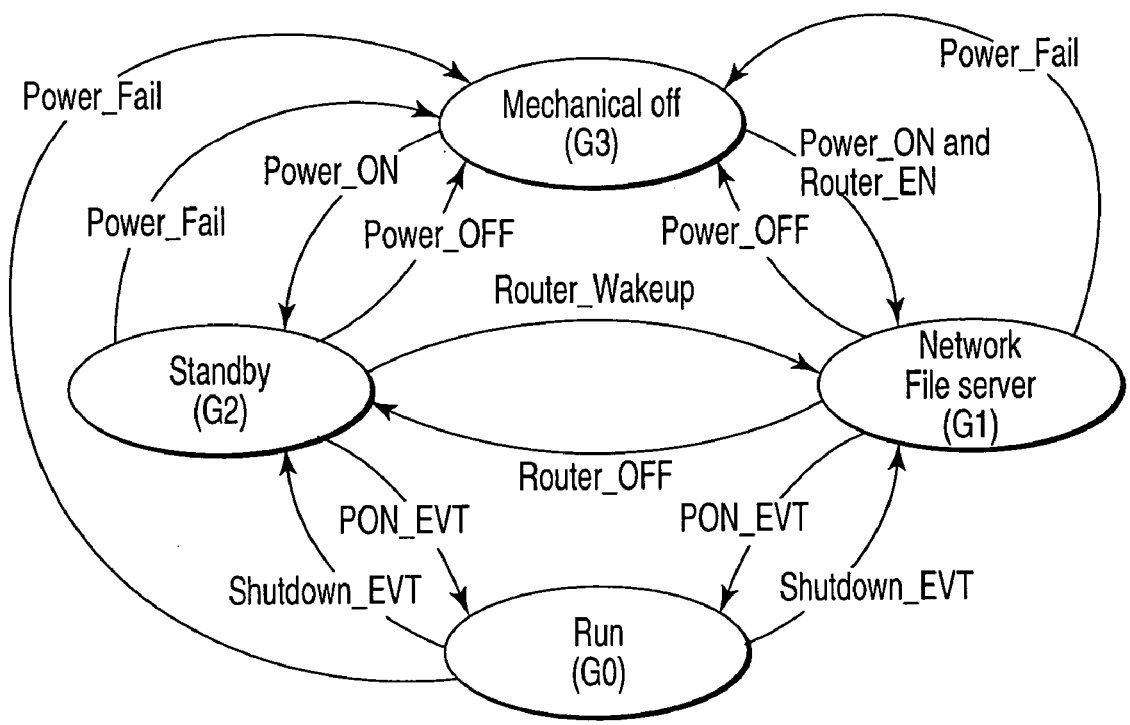
FIG. 4 is a diagram showing a transition of each of the operating modes (or states) according to each of different events.

A relationship between operating modes and events will be described with reference to FIGS. 4 and 5. FIG. 4 is a diagram showing a transition of each of the operating modes (or states) according to each of the events. FIG. 5 is a table of definitions of the events shown in FIG. 4.

The mechanical-off mode (state G3) shown in FIG. 4 shifts to the standby mode (state G2) in principle when the main power of the main unit is turned on or a power plug is inserted into the main unit (or when an event Power_ON is received). However, the mechanical-off mode shifts to the network/file server mode (state G1) if the routing mode shifting switch of the main unit turns on or specific information preset in a nonvolatile memory area indicates "valid" (or Router_EN indicates "1").

The standby mode (state G2) shown in FIG. 4 shifts to the network/file server mode (state G1) when an event Router_Wakeup to make a request to start network service is received from a device provided on the main unit or a device connected to the network. The standby mode also shifts to the run mode (state G0) when an event PON_EVT to make a request to turn on the power is received therefrom. Further, the standby mode shifts to the mechanical-off mode (state G3) when the main power of the main unit is turned off, the power plug is removed from the main unit (or the event Power_OFF is received), or an event Power_Fail indicative of a power abnormality is received.

The network/file server mode (state G1) shown in FIG. 4 shifts to the standby mode (state G2) when an event Router_OFF to make a request to end network service is received from a device provided on the main unit or a device connected to the network. The network/file server mode also shifts to the run mode (state G0) when an event PON_EVT to make a request to turn on the power is received therefrom. Further, the network/file server mode shifts to the mechanical-off mode (state G3) when the main power of the main unit is turned off, the power plug is removed from the main unit (or the event Power_OFF is received), or an event Power_Fail indicative of a power abnormality is received.

The run mode (state G0) shown in FIG. 4 shifts to the standby mode (state G2) when an event Shutdown_EVT to make a request to turn off the power is received from a device provided on the main unit or a device connected to the network. However, the run mode shifts to the network/file server mode (state G1) if the routing mode shifting switch of the main unit turns on or specific information preset in a nonvolatile memory area indicates "valid" (or Router_EN indicates "1"). The run mode shifts to the mechanical-off mode (state G3) when an event Power_Fail indicative of a power abnormality is received.

There are Power_ON, Power_OFF, Router_EN, Router_Wakeup, Router_OFF, PON_EVT, Shutdown_EVT and Power_Fail as events detected by the uCOM as shown in FIG. 5.

The Power_ON is generated when the main power of the main unit is turned on or the power plug is inserted into the main unit.

The Power_OFF is generated when the main power of the main unit is turned off or the power plug is removed from the main unit.

The Router_EN is generated when the routing mode shifting switch of the main unit is changed or it is indicated as specific information preset in a nonvolatile memory area. When a value of Router_EN is 0 (invalid), it means that the state should be shifted from G3 to G2 and from G0 to G2 or G1. When the value is 1 (valid), it means that the state should be shifted from G3 to G1 and from G0 to G1.

The Router_Wakeup is an event to make a request to start a network service. The Router_OFF is an event to make a request to end a network service. The PON_EVT is an event to make a request to turn on the power. The Shutdown_EVT is an event to make a request to turn off the power. These events are generated from devices provided on the main unit and devices connected to the network. For example, the events are generated from the router power button of the panel switch section 118, that on the remote control, RTC timer, devices on the LAN, those on the wireless LAN, those on the WAN, USB-capable devices (e.g., keyboard), Bluetooth-capable devices, and IEEE 1394-capable devices.

The Power_Fail is an event that is generated when a power abnormality occurs.

The foregoing run mode (state G0) includes a plurality of states. In this mode, the uCOM 116 selectively supplies and stops power to each of elements that make up the stream controller 300 to process AV data so as to decrease power consumption more effectively according to the circumstances.

The states included in the run mode will now be described with reference to FIG. 6.

There are at least three states: an idle state (state ST2), a storage use state (state ST1), and a run state (state ST0).

In the idle state (state ST2), the front end 122, stream interface 201, audio processor 205, or video processor 206 shown in FIG. 1 is not supplied with power but turned off. On the other hand, the MPU 200, memory controller 202, and host interface 203 are supplied with power and run or stand by.

The storage use state (state ST1) is set when file processing is performed as the file function, media conversion is performed, and the like. As in the above state, the front end 122, stream interface 201, audio processor 205, or video processor 206 is not supplied with power and thus turned off; however, the IDE controller 204 is supplied with power.

The run state (state ST0) is divided into four states AV0, AV1, AV2 and Audio.

The state AV0 is set when stream data of live broadcasting is received, time-shift video recording is performed, and the like. In the state AV0, the MPU 200, memory controller 202, host interface 203, front end 122, stream interface 201, audio processor 205, and video processor 206 are all supplied with power. The MPU 200, memory controller 202, and host interface 203 run or stand by. The front end 122, stream interface 201, video processor 206 and audio processor 205 run.

The state AV1 is set when video is played back, network contents are reproduced, an image viewer is used, a mailer/browser is used, video is edited, and the like. In the state AV1, the MPU 200, memory controller 202, and host interface 203 run or stand by, the front end 122 and stream interface 201 turn off or stand by, and the video processor 206 and audio processor 205 run.

The state AV2 is set when video is recorded, audio is recorded, and the like. In the state AV2, the MPU 200, memory controller 202, and host interface 203 run or stand by, the front end 122 and stream interface 201 run, and the video processor 206 and audio processor 205 turn off or stand by.

The state Audio is set when audio is played, and the like. In the state Audio, the MPU 200, memory controller 202, and host interface 203 run or stand by, the front end 122, stream interface 201 and video processor 206 turn off or stand by, and the audio processor 205 runs.

Figure 7:
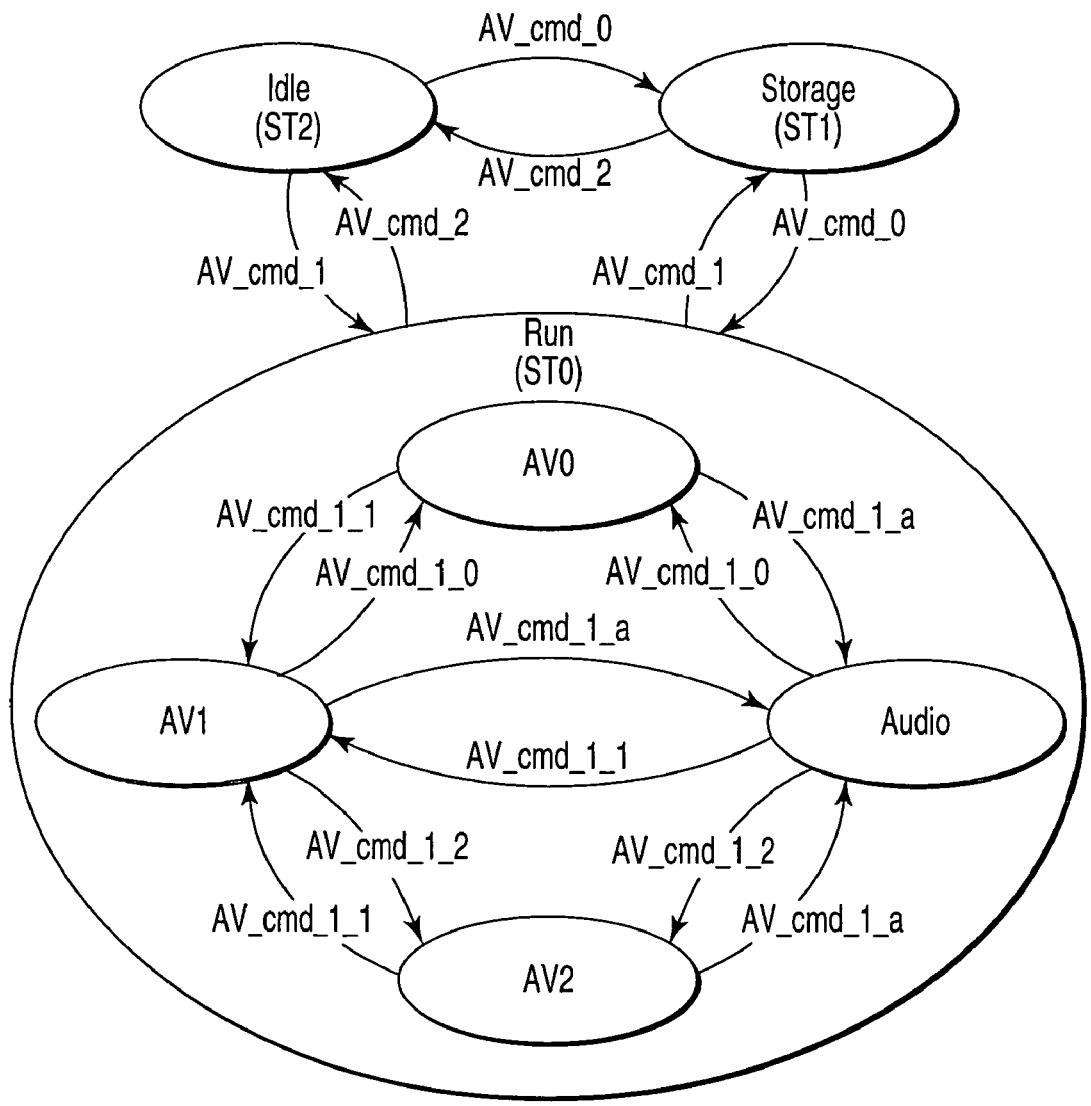
FIG. 7 is a diagram showing a transition of each of the states included in the run mode according to each of events (commands)

A relationship between the states included in the run mode and the events (commands) will be described with reference to FIGS. 7 and 8. FIG. 7 is a diagram showing a transition of each of the states according to each of the events (commands). FIG. 8 is a table of definitions of the events (commands). The events (commands) correspond to different commands issued from the panel switch section 118, remote control, or devices connected to the network.

The idle state (state ST2) shown in FIG. 7 shifts to the storage use state (state ST1) upon receiving a command (corresponding to the event AV_cmd_0) to make a request to perform file processing as a file server function and perform media conversion, etc. The idle state also shifts to the run state (state ST0) upon receiving a command (corresponding to event AV_cmd_1, i.e., each of events AV_cmd_1_0, AV_cmd_1_1, AV_cmd_1_2 and AV_cmd_1_a) to make a request to record/reproduce AV data.

The storage use state (state ST1) shown in FIG. 7 shifts to the run state (state ST0) upon receiving a command (corresponding to event AV_cmd_1) to make a request to record/reproduce AV data. The storage use state also shifts to the idle state (state ST2) upon receiving a command (corresponding to event AV_cmd_2) to make a request to stop the issued command.

The run state (state ST0) shown in FIG. 7 shifts to the storage use state (state ST1) upon receiving a command (corresponding to event AV_cmd_1) to make a request to perform file processing as a file sever function, media conversion, and the like. The run state also shifts to the idle state (state ST2) upon receiving a command (corresponding to event AV_cmd_2) to make a request to stop the issued command.

Between the four states AV0, AV1, AV2 and Audio, too, a transition in state is effected in accordance with each of the events AV_cmd_1_0, AV_cmd_1_1, AV_cmd_1_2 and AV_cmd_1_a, as shown in FIG. 7.

The event AV_cmd_0 corresponds to a command to make a request to perform file processing as a file server function, perform media conversion, and the like, as illustrated in FIG. 8. The event AV_cmd_1_0 corresponds to a command to make a request to receive stream data of live broadcast, perform time-shift video recording, and the like. The event AV_cmd_1_1 corresponds to a command to make a request to play back video, reproduce network contents, use an image viewer, use a mailer/browser, edit video, and the like. The event AV_cmd_1_2 corresponds to a command to make a request to record video, record audio, and the like. The event AV_cmd_1_a corresponds to a command to make a request to play back audio. The event AV_cmd_2 corresponds to a command to make a request to stop the issued command.

When two processing functions are fulfilled at the same time, the operating modes of circuit blocks (MPU 200, memory controller 202, host interface 203, front end 122, stream interface 201, audio processor 205 and video processor 206) used in both the processing functions are compared with each other (see FIG. 6), and the state shifts to one that satisfies the requirements of both the functions. For example, when video playback and video recording are performed at the same time, at least the MPU 200, memory controller 202 and host interface 203 need to run or stand by, and the front end 122, stream interface 201, video processor 206 and audio processor 205 need to run. In this case, the state shifts to state AV0.

A first example of a power control method according to the embodiment of the present invention will be described with reference to the flowcharts shown in FIGS. 9 to 11. The first example relates chiefly to a shift of the operating mode according to an event from the panel switch of the main unit or the remote control.

First, the power plug is removed or the main power switch of the main unit is in an off state (initial state). The operating mode is set in the mechanical-off mode (state G3) (step S11).

If the power plug is inserted or the main power switch of the main unit turns on (YES in step S12), the uCOM 116 starts up (step S13).

The uCOM 116 determines whether the operating mode should shift to the network/file server mode (state G1) based on the setting states of the router power switch or the setting information (values of Router_EN) preset in the nonvolatile memory area. If the operating mode shifts to the network/file server mode, the flow advances to step S21 in the flowchart shown in FIG. 10. If not, the operating mode is the standby mode (state G2).

If, in the standby mode, the main power switch of the main unit is turned off (i.e., the event Router_OFF is detected) or the power plug is removed (i.e., the event Power_Fail is detected) (YES in step S16), the flow returns to step S11 and the operating mode shifts to the mechanical-off mode.

Figure 10:
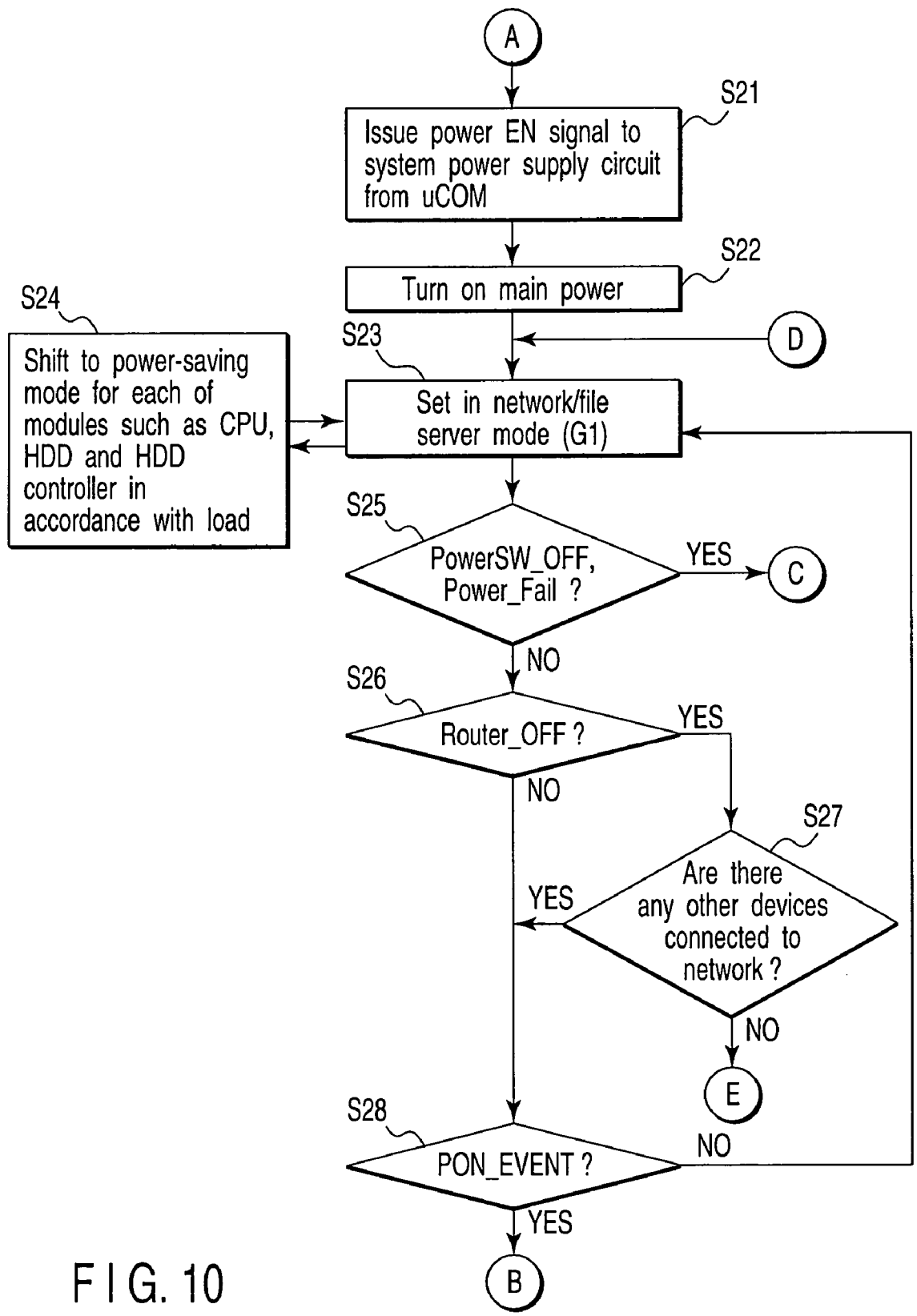
FIG. 10 is a second flowchart illustrating the first example of the power control method according to the embodiment of the present invention.

If, in the standby mode, the router power switch of the main unit or that (key) of the remote control is depressed (i.e., the event Router_Wakeup is detected) (YES in step S17), the flow advances to step S21 in the flowchart shown in FIG. 10.

Figure 11:
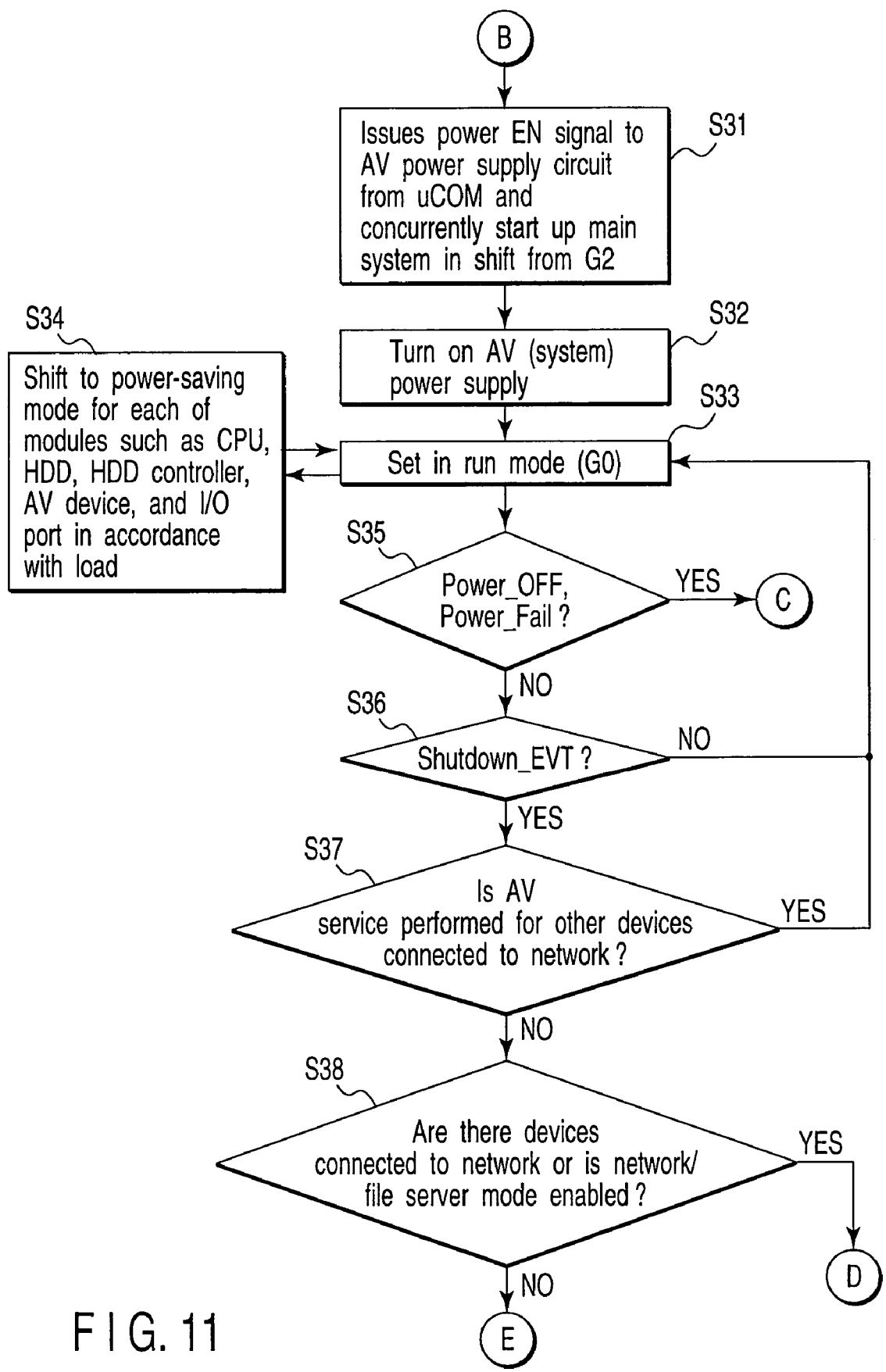
FIG. 11 is a third flowchart illustrating the first example of the power control method according to the embodiment of the present invention.

If, in the standby mode, the main power switch of the main unit or that (key) of the remote control is depressed or an AV command key (Play key, Eject key, etc.) is depressed (i.e., the event PON_EVT is detected) (YES in step S18), the flow advances to step S31 in the flowchart shown in FIG. 11.

If there are no changes in the above steps S16 to S18, the flow returns to step S15, and the standby mode remains unchanged (state G2).

As shown in FIG. 10, the uCOM 116 issues a power enable (EN) signal to a system power supply circuit (step S21), turns on the main power supply (step S22), and starts up the system to start network routing service as a router (server) (step S23) such that network routing can be performed. In other words, the operating mode shifts to the network/file server mode (state G1). In accordance with the load of each function and the in-use/not-in-use state thereof, the network/file server mode shifts to a predetermined power-saving mode (step S24) or returns to a normal network/file server mode for each of modules such as a CPU, an HDD and an HDD controller.

Figure 9:
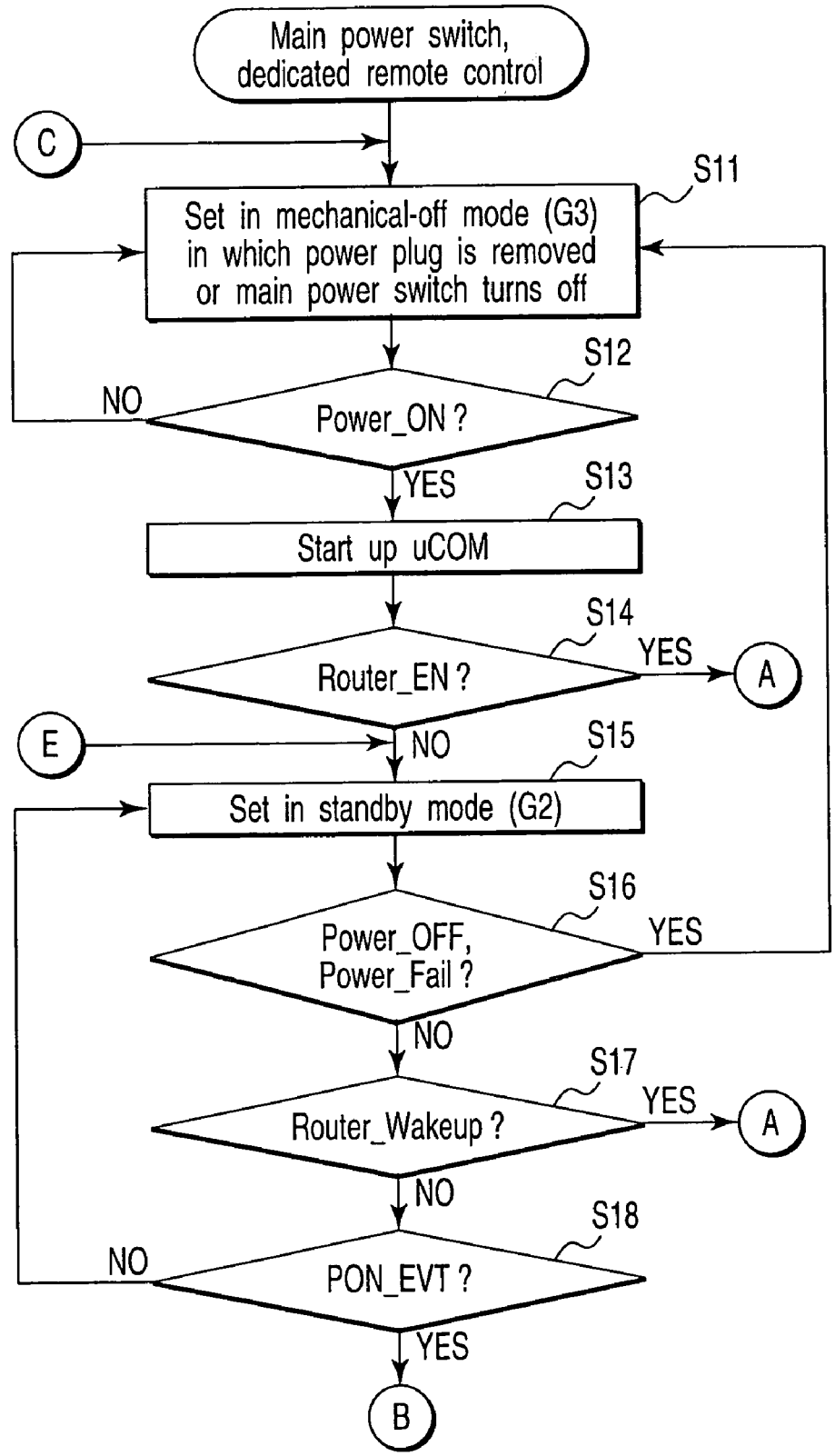
FIG. 9 is a first flowchart illustrating a first example of a power control method according to the embodiment of the present invention.

If, in the network/file server mode, the main power switch turns off (i.e., the event PowerSW_OFF is detected) or the power plug is removed (i.e., the event Power_Fail is detected) (YES in step S25), the flow returns to step S11 in the flowchart shown in FIG. 9. The operating mode shifts to the mechanical-off mode (state G3).

If, in the network/file server mode, the router power switch of the main unit or that (key) of the remote control is depressed (i.e., the event Router_OFF is detected) (YES in step S26) and there are no other devices connected to the network (NO in step S27), the flow returns to step S15 in the flowchart shown in FIG. 9. The operating mode shifts to the standby mode (state G2).

If, in the network/file server mode, the main power switch of the main unit or that (key) of the remote control is depressed or an AV command key (Play key, Eject key, etc.) is depressed (i.e., the event PON_EVT is detected) (YES in step S28), the flow advances to step S31 in the flowchart shown in FIG. 11.

If there are no changes in the above steps S25 to S28, the flow returns to step S23, and the system remains in the network/file server mode (state G1).

As shown in FIG. 11, the uCOM 116 issues a power enable (EN) signal to an AV power supply circuit (and concurrently the main system starts up in the shift from state G2) (step S31), turns on the AV power supply (step S32), and starts up the AV system (circuit) to be put in a full operation including AV and network routing service (step S33) such that AV data can be processed. In other words, the operating mode shifts to the run mode (state G0). In accordance with the load of each function and the in-use/not-in-use state thereof, the run mode shifts to a predetermined power-saving mode (step S34) or returns to a normal run mode for each of modules such as a CPU, an HDD, an HDD controller, an AV device, and an I/O port.

If, in the run mode, the main power switch turns off (i.e., the event Power_OFF is detected) or the power plug is removed (i.e., the event Power_Fail is detected) (YES in step S35), the flow returns to step S11 in the flowchart shown in FIG. 9. The operating mode shifts to the mechanical-off mode (state G3).

If, in the run mode, the router power switch of the main unit or that (key) of the remote control is depressed (i.e., the event Router_OFF is detected) (YES in step S36) and no AV service is performed for any other devices connected to the network (NO in step S37), the flow advances to the next step S38. If NO in step S36 or YES in step S37, the flow returns to step S33, and the system remains in the run mode.

If AV service is performed for devices connected to another network when the router power switch of the main unit or that (key) of the remote control is depressed and there are devices connected to the network or the network/file server mode is enabled (YES in step S38), the flow returns to step S23 in the flowchart shown in FIG. 10, and the operating mode shifts to the network/file server mode. If not (NO in step S38), the flow returns to step S15 in the flowchart shown in FIG. 9, and the operating mode shifts to the standby mode.

A second example of a power control method according to the embodiment of the present invention will be described with reference to the flowcharts shown in FIGS. 12 to 15. The second example relates chiefly to a shift of the operating mode according to an event from the devices connected to the network.

First, the power plug is removed or the main power switch of the main unit is in an off state (initial state). The system is set in the mechanical-off mode (state G3) (step S41).

If the power plug is inserted or the main power switch of the main unit turns on (YES in step S42), the uCOM 116 starts up (step S43).

The uCOM 116 determines whether the operating mode should shift to the network/file server mode (state G1) based on the setting states of the router power switch or the setting information (values of Router_EN) preset in the nonvolatile memory area. If the operating mode shifts to the network/file server mode, the flow advances to step S51 in the flowchart shown in FIG. 13. If not, the uCOM 116 determines whether Wakeup is authorized in advance by a device on the network (or Wakeup is enabled or not) (step S45).

If the Wakeup is authorized, the power supply of a necessary network device such as a LAN controller starts up (step S46), and the operating mode shifts to the standby mode (state G2) to monitor devices on the network (step S47). If not, the operating mode directly shifts to the standby mode (state G2) (step S47).

If, in the standby mode, the main power switch of the main unit is turned off (i.e., the event Router_OFF is detected) or the power plug is removed (i.e., the event Power_Fail is detected) (YES in step S48), the flow returns to step S41 and the operating mode shifts to the mechanical-off mode.

A device on the network issues a Wakeup packet (MAC address and Wakeup command) to the home network station serving as a server when the need arises. The device also issues a Req packet to confirm that the server starts up periodically for a fixed period of time.

If, in the standby mode, a Wakeup packet (MAC address and Wakeup command) is detected from the network (YES in step S49), the LAN controller issues a Wakeup event to the uCOM 116 (step S50). The flow advances to step S51 in the flowchart shown in FIG. 13.

Figure 13:
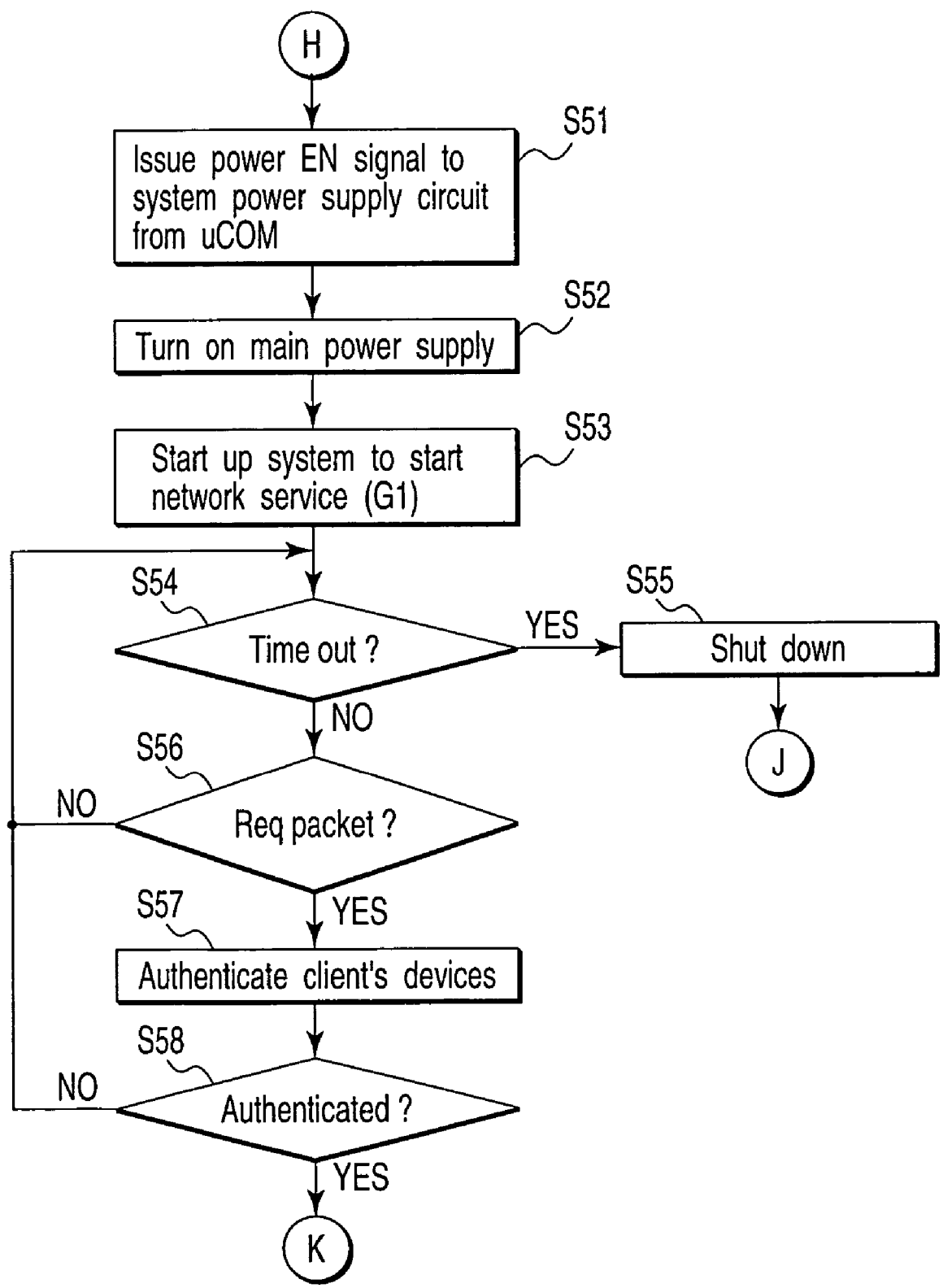
FIG. 13 is a second flowchart illustrating the second example of the power control method according to the embodiment of the present invention.

Referring to FIG. 13, the uCOM 116 issues a power enable (EN) signal to a system power supply circuit (step S51), turns on the main power supply (step S52) and starts up the system to start network service (step S53). In other words, the operating mode shifts to the network/file server mode (state G1).

If no request is issued from any device on the network within a fixed period of time after the Wakeup packet is received (YES in step S54), the system is shut down as time-out processing (step S55). The flow returns to step S47 in the flowchart shown in FIG. 12 and the operating mode shifts to the standby mode.

When a Req packet is received from a device on the network (YES in step S56), the device is authenticated (step S57). If the authentication succeeds (YES in step S58), the flow advances to step S61 in the flowchart shown in FIG. 14. If it fails, the flow returns to step S54.

Figure 14:
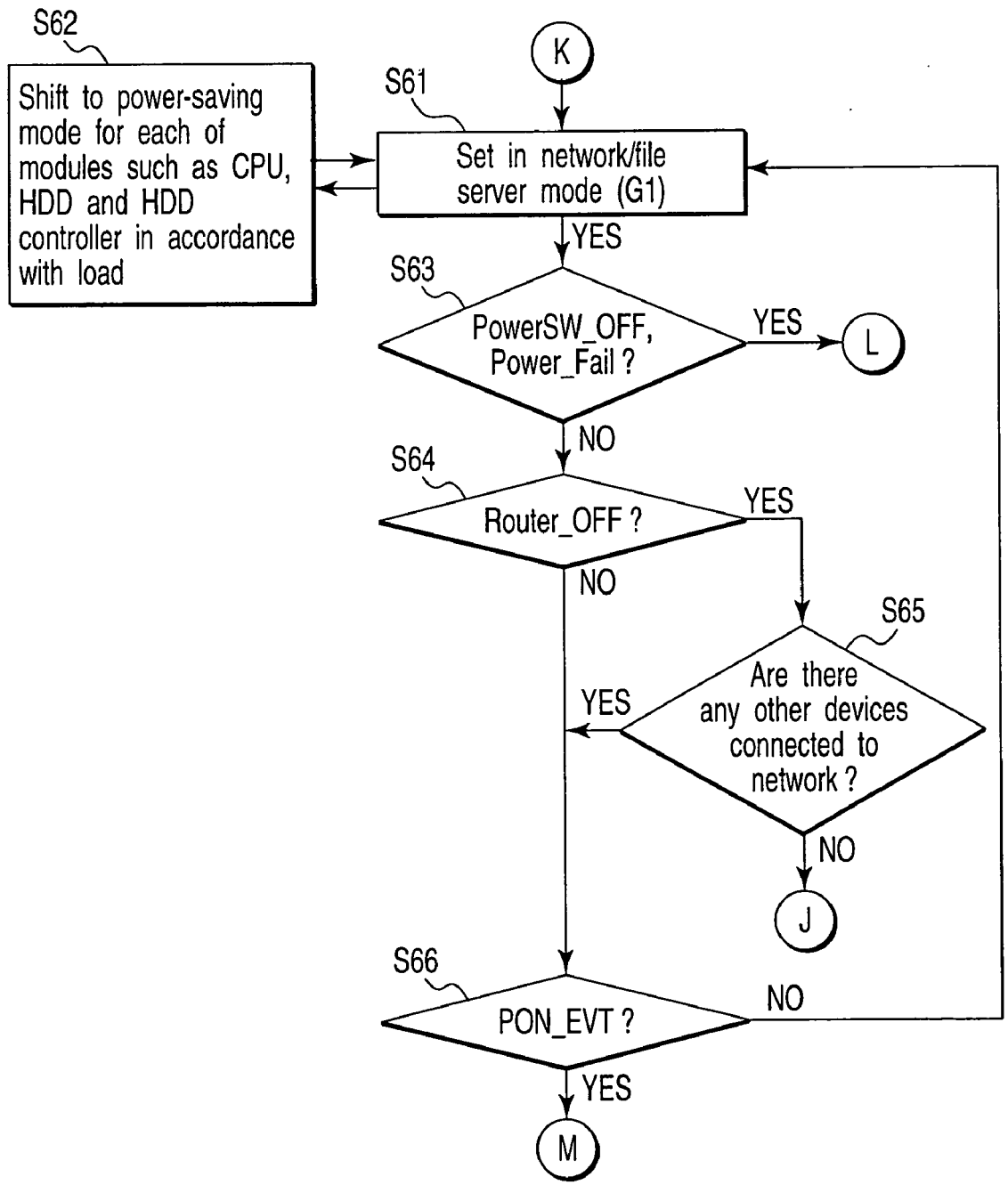
FIG. 14 is a third flowchart illustrating the second example of the power control method according to the embodiment of the present invention.

As shown in FIG. 14, the uCOM 116 starts network routing service as a router (server) (step S61). In accordance with the load of each function and the in-use/not-in-use state thereof, the network/file server mode shifts to a predetermined power-saving mode (step S62) or returns to a normal network/file server mode for each of modules such as a CPU, an HDD and an HDD controller.

Figure 12:
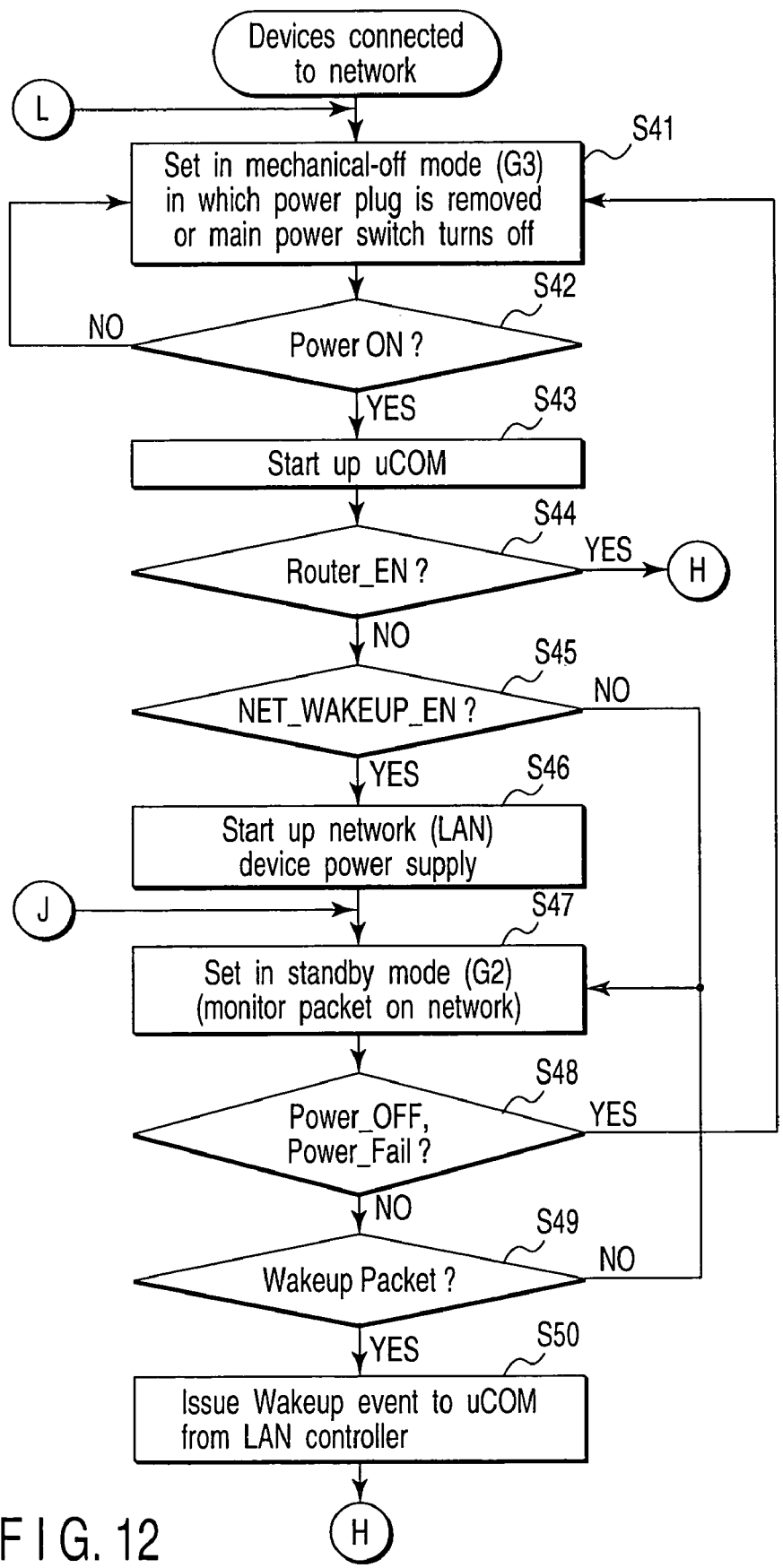
FIG. 12 is a first flowchart illustrating a second example of the power control method according to the embodiment of the present invention.

If, in the network/file server mode, the main power switch turns off (i.e., the event PowerSW_OFF is detected) or the power plug is removed (i.e., the event Power_Fail is detected) (YES in step S63), the flow returns to step S41 in the flowchart shown in FIG. 12. The operating mode shifts to the mechanical-off mode (state G3).

If, in the network/file server mode, the router power switch of the main unit or that (key) of the remote control is depressed (i.e., the event Router_OFF is detected) (YES in step S64) and there are no other devices connected to the network (NO in step S65), the flow returns to step S47 in the flowchart shown in FIG. 12. The operating mode shifts to the standby mode (state G2).

Figure 15:
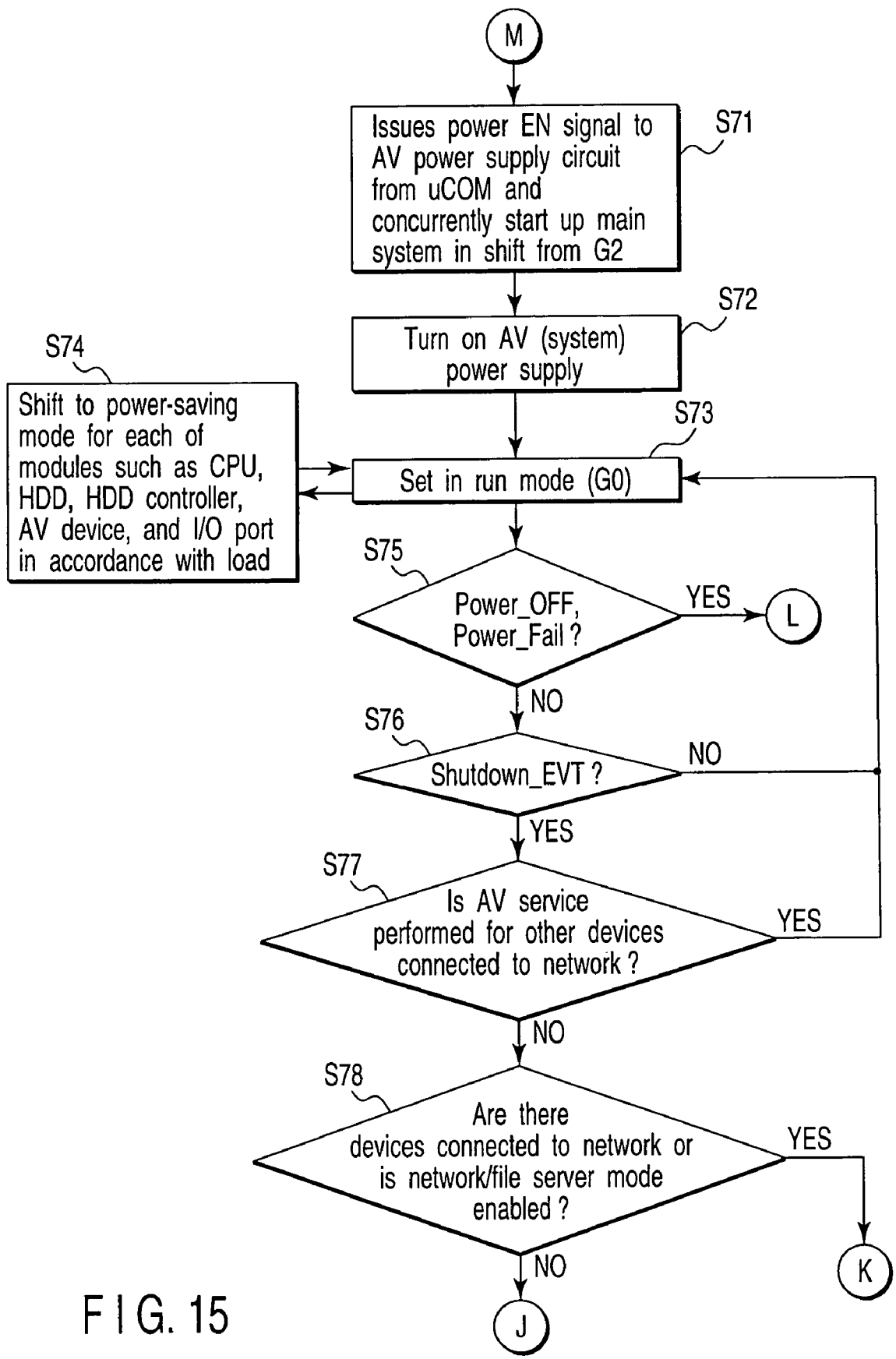
FIG. 15 is a fourth flowchart illustrating the second example of the power control method according to the embodiment of the present invention.

If, in the network/file server mode, a device (which has been authenticated) on the network issues a command to turn on the power supply (i.e., the event PON_EVT is detected) (YES in step S66), the flow advances to step S71 in the flowchart shown in FIG. 15.

As shown in FIG. 15, the uCOM 116 issues a power enable (EN) signal to an AV power supply circuit (and concurrently the main system starts up in the shift from state G2) (step S71), turns on the AV (system) power supply (step S72), and starts up the AV system (circuit) to be put in a full operation including AV and network routing service (step S73) such that AV data can be processed. In other words, the operating mode shifts to the run mode (state G0). In accordance with the load of each function and the in-use/not-in-use state thereof, the run mode shifts to a predetermined power-saving mode (step S74) or returns to a normal run mode for each of modules such as a CPU, an HDD, an HDD controller, an AV device, and an I/O port.

If, in the run mode, the main power switch turns off (i.e., the event Power_OFF is detected) or the power plug is removed (i.e., the event Power_Fail is detected) (YES in step S75), the flow returns to step S41 in the flowchart shown in FIG. 12. The operating mode shifts to the mechanical-off mode (state G3).

If, in the run mode, a device (which has been authenticated) on the network issues a shutdown command (i.e., the event Shutdown_EVT is detected) (YES in step S76) and no AV service is performed for other devices connected to the network (NO in step S77), the flow advances to the next step S78. If NO in step S76 or YES in step S77, the flow returns to step S73, and the system remains in the run mode.

If AV service is performed for other devices connected to the network and there are devices connected to the network or the network/file server mode is enabled when a device on the network issues a command to shut down the system (YES in step S78), the flow returns to step S61 in the flowchart shown in FIG. 14, and the operating mode shifts to the network/file server mode. If not (NO in step S78), the flow returns to step S47 in the flowchart shown in FIG. 12, and the operating mode shifts to the standby mode.

According to the above embodiment of the present invention, an electronic device such as a home network station can switch the operating mode for power management among the mechanical-off mode, standby mode, network/file server mode and run mode in accordance with the circumstances to maintain the performance of the system and effectively reduce power consumption.

As described above in detail, an electronic device according to the present invention can effectively suppress power consumption of circuit blocks whose power consumption is high.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
    a first circuit block which executes a data processing, the first circuit block including a stream controller that receives broadcast stream data and an I/O processor that processes input/output data;
    a second circuit block which executes network routing and file processing, the second circuit block containing a network controller that executes data communication via a network, a hard disk drive (HDD) that stores data, and an HDD controller that controls the HDD; and
    a controller which selects an operating mode from among a plurality of operating modes, the plurality of operating modes including:
        i) a mechanical-off mode in which a power switch turns off and a system does not operate but power is supplied to a real time clock timer,
        ii) a standby mode in which power of the system is turned off but power is supplied to a power management microcomputer or its equivalent hardware to receive wakeup event,
        iii) a run mode in which power is supplied to at least the first circuit block and the second circuit block, and
        iv) a network/file server mode to allow a service of network routing using a router function in which power is supplied to at least the network controller in the second circuit block to enable the router function but power is not supplied to the first circuit block, and to allow a service of file processing using a file server function in which power is supplied to at least the HDD and the HDD controller in the second circuit block to enable the file server function but power is not supplied to the first circuit block, the network/file server mode being capable of shifting to/from any one of the mechanical-off mode, the standby mode, and the run mode.

2. The electronic device according to claim 1, wherein the first circuit block includes a circuit block which processes audiovisual data.

3. The electronic device according to claim 1, wherein the controller selectively supplies and stops power to each of elements that make up the first circuit block according to circumstances when the run mode is selected.

4. The electronic device according to claim 1, further comprising designation means for designating whether the operating mode should shift to the network/file server mode when a main power switch of the electronic device turns on, and
    wherein the controller shifts the operating mode to one of the network/file server mode and the standby mode, in accordance with a designation by the designation means when the main power switch of the electronic device turns on.

5. The electronic device according to claim 1, further comprising storage means for storing information to determine whether the operating mode should shift to the network/file server mode when a main power switch of the electronic device turns on, and
    wherein the controller shifts the operating mode to one of the network/file server mode and the standby mode, in accordance with the information stored in the storage means when the main power switch of the electronic device turns on.

6. The electronic device according to claim 1, wherein the controller shifts the operating mode to the standby mode if no request is issued from any device on a network after a lapse of a fixed period of time after the operating mode shifts to the network/file server mode.

7. The electronic device according to claim 1, further comprising instruction means for instructing the second circuit block to turn on/turn off, and wherein the controller shifts the operating mode to one of the network/file server mode and the standby mode, in accordance with an instruction by the instruction means.

8. The electronic device according to claim 1, wherein the controller selects the operating mode from among at least the run mode, the network/file server mode, and the standby mode, in accordance with a request from a device on a network.

9. The electronic device according to claim 8, wherein the controller detects a type of an event issued from each of controllers which control a connection with the network to recognize the request from a device on the network.

10. The electronic device according to claim 8, wherein the controller responds to the request from a device on the network after authenticating the device.

11. The electronic device according to claim 1, wherein the controller selectively supplies and stops power to each of elements that make up the second circuit block according to circumstances when the network/file server mode is selected.

12. A power control method applied to an electronic device having a first circuit block which executes a data processing, the first circuit block including a stream controller that receives a broadcast stream data and an I/O processor that processes input/output data, and a second circuit block which executes network routing and file processing, the second circuit block containing a network controller that executes data communication via a network, a hard disk drive (HDD) that stores data, and an HDD controller that controls the HDD, the method comprising:
monitoring a status of the electronic device; and
selecting an operating mode from among a plurality of operating modes, the plurality of operating modes including:
i) a mechanical-off mode in wich a power switch turns off and a system does not operate but power is supplied to a real time clock timer, p2 ii) a stanby mode in which power of the system is turned off but power is supplied to a power management microcomputer or its equivalent hardware to receive wakeup event,
iii) a run mode in which power is supplied to at least the first circuit block and the second circuit block, and
iv) a network/file server mode to allow a service of network routing using a router function in which power is supplied to at least the network controller to enable the router function but power is not supplied to the first circuit block, and to allow a service of file processing using a file server function in which power is supplied to at least the HDD and the HDD controller to enable the file server function but power is not supplied to the first circuit block, the network/file server mode being capable of shifting to/from any one of the mechanical-off mode, the standby mode, and the run mode.

13. The power control method according to claim 12, further comprising selectively supplying and stopping power to each of elements that make up the first circuit block according to circumstances when the run mode is selected.

14. The power control method according to claim 12, further comprising shifting the operating mode to standby mode if no request is issued from any device on a network after a lapse of a fixed period of time after the operating mode shifts to the network/file server mode.

15. The power control method according to claim 12, further comprising selecting the operating mode from among at least the run mode, the network/file server mode, and the standby mode, in accordance with a request from a device on a network.

16. The power control method according to claim 15, further comprising detecting a type of an event issued from each of controllers which control a connection with the network to recognize the request from a device on the network.

17. The power control method according to claim 15, further comprising responding to the request from a device on the network after authenticating the device.

18. The power control method according to claim 12, further comprising selectively supplying and stopping power to each of elements that make up the second circuit block according to circumstances when the network/file server mode is selected.

* * * * *

UNITED STATES PATENT AND TRADEMARK OFFICE
CERTIFICATE OF CORRECTION

| | |
|---|---|
| PATENT NO. | : 7,260,729 B2 |
| APPLICATION NO. | : 10/917297 |
| DATED | : August 21, 2007 |
| INVENTOR(S) | : Araki |

It is certified that error appears in the above-identified patent and that said Letters Patent is hereby corrected as shown below:

Claim 12, column 15, line 36, change "wich" to --which--.

Claim 12, column 15, line 38, change "p2 ii) a stanby" to --ii) a standby--.

Claim 14, column 16, line 19, change "to standby" to --to the standby--.

Signed and Sealed this

Sixth Day of November, 2007

JON W. DUDAS
*Director of the United States Patent and Trademark Office*